(12) United States Patent
Lindberg

(10) Patent No.: US 8,848,016 B2
(45) Date of Patent: Sep. 30, 2014

(54) VIDEOPHONE INPUT APPARATUS UTILIZING VIDEO CALL CONTROL FUNCTIONS BASED ON OPEN AND CLOSED POSITIONS OF COVER PART

(75) Inventor: Phillip Lindberg, Helsinski (FI)

(73) Assignee: Twinelab Oy, Espoo (FI)

( * ) Notice: Subject to any disclaimer, the term of this patent is extended or adjusted under 35 U.S.C. 154(b) by 176 days.

(21) Appl. No.: 13/483,366

(22) Filed: May 30, 2012

(65) Prior Publication Data

US 2013/0321551 A1 Dec. 5, 2013

(51) Int. Cl.
*H04N 7/15* (2006.01)
(52) U.S. Cl.
CPC ........................................ *H04N 7/15* (2013.01)
USPC ................... 348/14.01; 348/14.02; 348/14.12
(58) Field of Classification Search
CPC ......... H04N 7/14; H04N 7/141; H04N 7/142; H04N 7/144; H04N 7/147; H04N 21/4788; H04N 2007/145; H04N 1/99307; H04N 1/00381; H04M 2201/50; H04M 2550/12; H04M 2250/52; H04M 2201/0084
USPC ........................................... 348/14.01–14.16
See application file for complete search history.

(56) References Cited

U.S. PATENT DOCUMENTS

| 4,812,864 | A | 3/1989 | Baker | |
|---|---|---|---|---|
| 2005/0088513 | A1* | 4/2005 | Oswald et al. | 348/14.02 |
| 2005/0233766 | A1* | 10/2005 | Futami | 455/556.1 |
| 2007/0009247 | A1* | 1/2007 | Maeda et al. | 396/72 |
| 2008/0171571 | A1* | 7/2008 | Feil et al. | 455/556.1 |
| 2009/0111512 | A1* | 4/2009 | Demuynck | 455/556.1 |

FOREIGN PATENT DOCUMENTS

| EP | 309341 A1 | 3/1989 |
|---|---|---|
| EP | 1404121 A1 | 3/2004 |
| GB | 2368992 A | 5/2002 |

OTHER PUBLICATIONS

Extended European Search Report; Application No. 13169839.1; Dated Mar. 18, 2014.

\* cited by examiner

*Primary Examiner* — Melur Ramakrishnaiah
(74) *Attorney, Agent, or Firm* — Ziegler IP Law Group LLC

(57) ABSTRACT

A videophone input apparatus includes a body part configured to protect a circuit board of the apparatus; a cover part configured to be movable between an open position and a closed position, and when in said closed position, to at least partially received by the body part. The apparatus further includes a lens located in the cover part, configured to receive incoming rays of light in an operating position when the cover part being in said open position, and the lens configured to be hidden, by the body part, in a standby position when the cover part being in said closed position; an image sensor located on the circuit board, configured to convert the directed rays of light to an electronic image signal; and a mirror configured to direct the rays of light from the lens to the image sensor.

17 Claims, 4 Drawing Sheets

VIDEOPHONE INPUT APPARATUS UTILIZING VIDEO CALL CONTROL FUNCTIONS BASED ON OPEN AND CLOSED POSITIONS OF COVER PART

TECHNICAL FIELD

The present application generally relates to a method, an optical system and an apparatus for providing a videophone service.

BRIEF DESCRIPTION OF RELATED DEVELOPMENTS

Due to recent advances of mobile telecommunications, popularity of mobile phones has been greatly increased. At the same time, the usage of fixed landline phone connections at home has been reduced. Video calls are widely used as a communication method providing people not only speech but streaming video of the other party as well. High-speed telecommunication networks enable video call activation between computers and cellular phones.

However, using computers or cellular phones for video calls has certain drawbacks. First, such devices are typically personal in a sense that they are carried with the person owning the device. Thus, receiving or making a video call to/from home always requires that there is someone at home with a capable video call device. Second, current videophones utilized by cellular phones have a limited input/output means, such as a camera and display. For example, if several persons would like get involved to the video call, arranging the persons around the cellular phone is difficult and uncomfortable. Third, current videophones utilized by computers require large devices, such as a personal computer and a monitor placed to a room of an apartment, in which the video call is to be established. Such arrangement is not acceptable in most living rooms.

Furthermore, a complex triggering of an outgoing video call or responding to an incoming video call may exist. Even furthermore, users need to be able to ensure the availability of the camera of the apparatus.

Thus, a solution is needed that is easy-to-use, low-cost and highly-functional as a shared object. Furthermore, such a videophone apparatus is needed that would provide a relatively small sized videophone input apparatus for the video call, easy activation and deactivation of the video call and mechanism for hiding the camera lens for ensured privacy and lens protection. Furthermore, such videophone input apparatus should be provided without disturbing the interior decoration of the home apartment or the office.

SUMMARY

According to a first example aspect of the disclosed embodiments there is provided a videophone input apparatus comprising:
a body part configured to protect a circuit board of the apparatus;
a cover part configured to be movable between an open position and a closed position;
a lens located in the cover part, configured to receive incoming rays of light in an operating position when the cover part being in said open position, and the lens configured to be hidden, by the body part, in a standby position when the cover part being in said closed position;
an image sensor configured to convert the rays of light directed from the lens to an electronic image signal;
at least one processor; and
at least one memory including computer program code;
the at least one memory and the computer program code configured to, with the at least one processor, cause the videophone input apparatus to:
define video call control functions based on the open and closed positions of the cover part.

In an embodiment, the at least one memory and the computer program code further configured to, with the at least one processor, cause the videophone input apparatus to:
determine an answering function in response to detecting the cover part in open position; and
determine a rejecting function in response to detecting the cover part in closed position.

The cover part, when in said closed position, may be configured to be at least partially received by the body part.

In an embodiment, the imaging sensor may be located on the circuit board; and the videophone input apparatus further comprising a mirror configured to direct the rays of light from the lens to the image sensor.

The mirror may be configured to be movable. In an embodiment, the mirror is configured to be moved in response to the moving of the cover part.

In an embodiment, the image sensor is surface mounted on the circuit board.

In an embodiment, the videophone input apparatus further comprising a sensor configured to provide position information of the cover part. The mirror may further be in an operating position above the image sensor, and a surface plane of the mirror configured to be nonparallel to a surface plane of the image sensor, when the cover part is in open position.

In an embodiment, the mirror is in a storage position above the image sensor and a surface plane of the mirror is configured to be essentially parallel to a surface plane of the image sensor, when the cover part is in closed position.

In an embodiment, the mirror is configured to be rotatable 45 degrees in response to the cover part moving from the closed position to the open position.

In an embodiment, the videophone input apparatus further comprising:
a communication interface for communicating with a system server, a peer and an A/V output apparatus;
at least one processor; and
at least one memory including computer program code;
the at least one memory and the computer program code configured to, with the at least one processor, cause the videophone input apparatus to:
connect the videophone input apparatus via a local connection to the A/V output apparatus;
establish a peer-to-peer connection between the videophone input apparatus and the peer over a wireless connection;
trigger a videophone service over the peer-to-peer connection in response to the position information of the cover part;
provide video input data for the videophone service using the image signal provided by the image sensor; and
provide user output data, from the peer, for the videophone service using the A/V output apparatus.

In an embodiment, the videophone input apparatus further comprises:
a microphone configured to receive an incoming audio signal in an operating position when the cover part being in said open position, and the microphone configured to be muted, by the body part, in a standby position when the cover part being in said closed position.

The microphone may be configured to be disconnected in response to detecting the cover part in closed position.

In an embodiment, the at least one memory and the computer program code further configured to, with the at least one processor, cause the videophone input apparatus to:

determine an unmute function in response to detecting the cover part in open position; and determine a mute function in response to detecting the cover part in closed position.

According to a second example aspect of disclosed embodiments there is provided a method comprising:

moving a cover part of a videophone input apparatus between an open and a closed position, the body part configured to protect a circuit board of the apparatus, the cover part comprising a lens, wherein when in said closed position, the lens configured to be hidden by the body part; and when in said open position, the lens configured to receive incoming rays of light;

receiving the incoming rays of light using the lens located in the cover part, when the cover part being in said open position;

directing the received rays of light from the lens to an image sensor; converting the directed rays of light to an electronic image signal using the image sensor; and defining video call control functions based on the open and closed positions of the cover part.

According to a third example aspect of disclosed embodiments there is provided an A/V output apparatus, comprising an integrated videophone input apparatus comprising:

a body part configured to protect a circuit board of the A/V output apparatus;

a cover part configured to be movable between an open position and a closed position;

a lens located in the cover part, configured to receive incoming rays of light in an operating position when the cover part being in said open position, and the lens configured to be hidden, by the body part, in a standby position when the cover part being in said closed position;

an image sensor configured to convert the rays of light directed from the lens to an electronic image signal;

at least one processor; and at least one memory including computer program code;

the at least one memory and the computer program code configured to, with the at least one processor, cause the A/V output apparatus to:

define video call control functions based on the open and closed positions of the cover part.

According to a fourth example aspect of disclosed embodiments there is provided a computer program embodied on a computer readable medium comprising computer executable program code, which when executed by at least one processor of a videophone input apparatus, causes the videophone input apparatus to:

detect position information of a cover part of the videophone input apparatus, the cover part configured to be movable between an open position and a closed position; and define video call control functions based on the open and closed positions of the cover part.

According to a fifth example aspect of disclosed embodiments there is provided an optical system comprising:

a cover part of an apparatus configured to be movable between an open position and a closed position;

a lens located in the cover part, configured to receive incoming rays of light in an operating position when the cover part being in said open position, and the lens configured to be hidden, by a body part of the apparatus, in a standby position when the cover part being in said closed position;

an image sensor configured to convert the rays of light directed from the lens to an electronic image signal; wherein video call control functions being defined based on the open and closed positions of the cover part.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
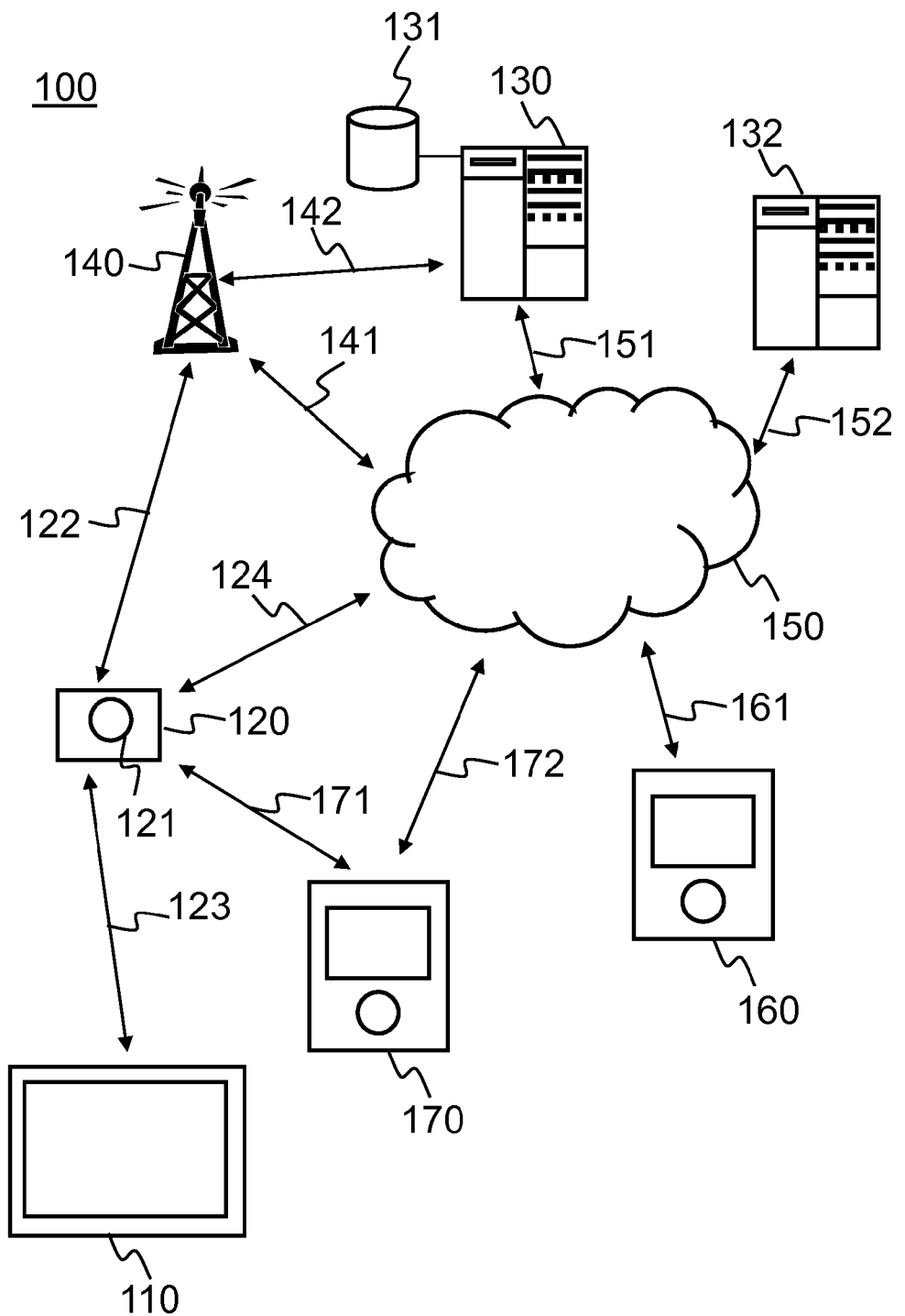
FIG. 1 shows a schematic picture of a system according to an aspect of the disclosed embodiments.

FIG. 1 shows a schematic picture of a system 100 according to an example embodiment. A user apparatus, such as a videophone input apparatus 120 may comprise a mobile terminal without a display and comprising a communication interface, for example. The videophone input apparatus 120 is capable of downloading and locally executing software program code. The software program code may be a client application of a service whose server application is running on a server apparatus 130, 132 of the system 100. The videophone input apparatus 120 may comprise a camera 121 for providing video stream for the video call and a microphone for providing audio stream for the video call, for example. In an embodiment, the videophone input apparatus may comprise a ringer or a notification speaker 290. The videophone input apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The videophone input apparatus 120 is configured to be connectable to the public data communication network 150, for example the Internet, directly over a data connection 124 that may comprise a fixed broadband access.

In an embodiment, the system 100 comprises an A/V output apparatus 110 configured to be connectable to the videophone input apparatus 120 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 110 and the videophone input apparatus 120, for example. The A/V output apparatus 110 may comprise a television, for example. The videophone input apparatus 120 may also be integrated to the A/V output apparatus 110.

In an embodiment, the system 100 comprises a server apparatus 130, which comprises a storage device 131 for storing service data, service metrics and subscriber information, over data connection 151. The service data may comprise configuration data, account creation data, peer-to-peer service data over cellular network and peer-to-peer service data over wireless local area network (WLAN), for example. The service metrics may comprise operator information for use in both user identification and preventing service abuse, as the device 120 and the user account are locked to a subscriber of an operator network using the subscriber identity module (SIM) of the device 120 and the service account details.

In an embodiment, service data may travel over different paths. A first path may comprise sending configuration information over a wireless communication network 122, 140, 142 from the server apparatus 130. A second path may comprise sending account creation data between the server apparatus 130 and a peer-to-peer service apparatus 160 over the data connection 150, 151, 161, for example.

In an embodiment, a proprietary application in the videophone input apparatus 120 may be a client application of a service whose server application is running on the server apparatus 130 of the system 100 and whose peer-to-peer client application is running on the peer-to-peer service apparatus 160. The proprietary application may capture the user input data for the videophone service and provide the user output data, from the peer, for the videophone service using the A/V output apparatus 110 over the local connection 123. In an embodiment, configuration information between the videophone input apparatus 120 and the system server 130 is transceived via the first wireless connection 122, 140, 142 automatically and configured by the server apparatus 130. Thus the user of the videophone input apparatus 120 may not need to do any initialization or configuration for the service. The system server 130 may also take care of account creation process for the service, such as videophone service between the videophone input apparatus 120 and the peer 160.

In an embodiment, the system 100 comprises a service server apparatus 132, for storing service data, service metrics and subscriber information, over data connection 152. The service data may comprise service account data, peer-to-peer service data and service software, for example.

In an embodiment, a proprietary application in the videophone input apparatus 120 is a client application of a service whose server application is running on the server apparatus 132 of the system 100 and whose peer-to-peer client application is running on the peer-to-peer service apparatus 160. The proprietary application may capture the user input data for the videophone service and provide user output data, from the peer, for the videophone service of the service server 132 using the A/V output apparatus 110 over the local connection 123. In an embodiment, configuration information between the videophone input apparatus 120 and the system server 130 is transceived via the first wireless connection 122, 140, 142 automatically and configured by the system server apparatus 130. Furthermore, the system server apparatus 130 may automatically create a service account in the service server 132, for the videophone input apparatus 120. Thus the user of the videophone input apparatus 120 may not need to do any initialization or configuration for the service. The system server 130 may take care of account creation process for the service, such as videophone service between the videophone input apparatus 120 and the peer 160.

In an embodiment, a videophone call may be established as a peer-to-peer connection between the videophone input apparatus 120 and the peer 160 over a second wireless connection 122, 140, 141 to the public data communication network 150, 161 and to the peer 160. The second wireless connection 122, 140, 141 may comprise for example a wireless local area network connection.

In an embodiment, a videophone call may be established as a peer-to-peer connection between the videophone input apparatus 120 and the peer 160 over a second wireless connection 122, 140, 142 to the public data communication network 150, 161 and to the peer 160. The second wireless connection 122, 140, 142 may comprise for example a cellular network connection provided by an operator of the system server 130.

In an embodiment, a videophone call may be established as a peer-to-peer connection between the videophone input apparatus 120 and the peer 160 over a data connection 124 to the public data communication network 150, 161 and to the peer 160. The data connection 124 may comprise for example a wired local area network connection.

In an embodiment, the videophone input apparatus 120 may be connected over a local connection 171 to a mobile apparatus 170, such as a mobile phone. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet, a laptop or a remote controller. The mobile apparatus 170 may be used for remotely controlling the videophone input apparatus 120.

In an embodiment, the videophone input apparatus 120 may be connected over a local data connection 124 to a network 150, such as Internet, and furthermore over a data connection 172 to the mobile apparatus 170 and over a data connection 151 to a system server apparatus 130, 131. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet or a laptop. The mobile apparatus 170 may be used for remotely controlling the videophone input apparatus 120. The videophone input apparatus 120 may be used primarily for consumption of media, whilst any configuration tasks (e.g. text entry for adding a friend to a contacts list) are performed elsewhere using existing tools with an appropriate affordance. In an embodiment, a web application utilizing the mobile apparatus 170 and a browser of the mobile apparatus 170 may be used to configure the videophone input apparatus 120. The mobile apparatus 170 may be authenticated and configuration data sent from the mobile apparatus 170 to the system server 130, 131 wherein configuration settings for the videophone input apparatus 120 is modified based on the received data. In an embodiment, the modified settings may then be sent to the videophone input apparatus 120 over the network 150 and the local connection 124 or the wireless operator 141, 140, 122. For example, a SMS-based configuration message may be used to convey the configuration data.

In an embodiment, other services and service providers than videophone service may be used. In such cases, service account creation process may be automatic for third party services as well. The service account created (e.g. for the videophone service) to the system server 130, 131 may be used to create further accounts for each service the user may choose. Such account creation may be done machine-to-machine between the system server 130, 131 and any third party, such as the service server 132. Thus, the system server 130, 131 may host all account credentials on behalf of the user or the group of users (e.g. a family or associated group of professionals in an office).

In an embodiment, configuration information between the videophone input apparatus and the system server may be transceived via the first wireless connection and a peer-to-peer connection may be established between the videophone input apparatus and the peer over a second wireless connection. The first connection for configuration information may be transmitted over cellular data connection (e.g. 3G or 4G) and the second connection for peer-to-peer content may be transmitted over non-cellular data connection (e.g. wireless LAN). However, the first or the second connection may be used for both purposes.

In an embodiment, the videophone input apparatus 120 does not comprise a display but is connected to an A/V apparatus for displaying video call related information for the user. Also speakers of the A/V apparatus may be used for providing audio information for the user.

In an embodiment, the videophone input apparatus 120 may comprise an A/V input apparatus. Thus the video input apparatus 120 may be integrated to the A/V apparatus, such as a television, to provide video call functionalities for the user. The integrated videophone apparatus may comprise the videophone input apparatus and the television. The television may comprise a smart television with display and audio speakers for providing video call output information for the user, as well as a video call application and connection to internet, for example.

Figure 2:
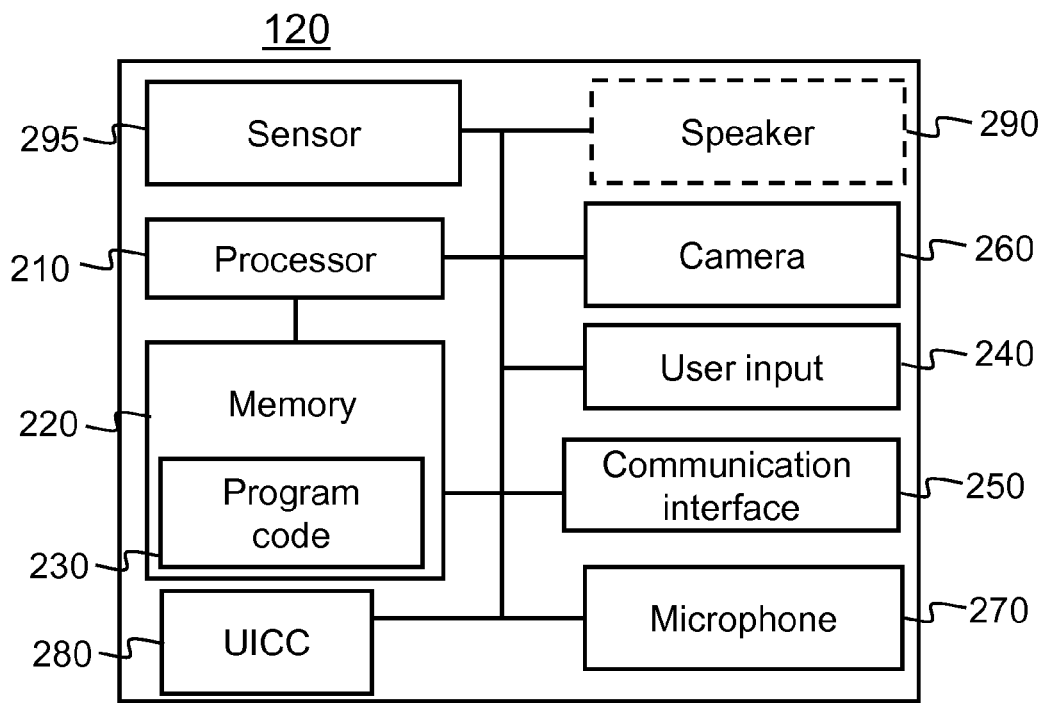
FIG. 2 presents an example block diagram of a videophone input apparatus.

FIG. 2 presents an example block diagram of a videophone input apparatus 120 in which various aspects of the disclosed embodiments may be applied. The videophone input apparatus 120 may be a user equipment (UE), user device or apparatus, such as a mobile terminal, or other communication device comprising a communication interface, a camera and a microphone.

The general structure of the videophone input apparatus 120 comprises a user input device 240, a communication interface 250, a microphone 270, a camera 260, a sensor 295, a processor 210, and a memory 220 coupled to the processor 210. The videophone input apparatus 120 further comprises software 230 stored in the memory 220 and operable to be loaded into and executed in the processor 210. The software 230 may comprise one or more software modules and can be in the form of a computer program product. The videophone input apparatus 120 may further comprise a universal integrated circuit card (UICC) 280.

The processor 210 may be, e.g., a central processing unit (CPU), a microprocessor, a digital signal processor (DSP), a graphics processing unit, or the like. FIG. 2 shows one processor 210, but the videophone input apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The videophone input apparatus 120 may comprise a plurality of memories. The memory 220 may be constructed as a part of the videophone input apparatus 120 or it may be inserted into a slot, port, or the like of the videophone input apparatus 120 by a user. The memory 220 may serve the sole purpose of storing data, or it may be constructed as a part of an apparatus serving other purposes, such as processing data.

The user input device 240 may comprise circuitry for receiving input from a user of the videophone input apparatus 120, e.g., via a keyboard, a touch-screen of the videophone input apparatus 120, speech recognition circuitry, gesture recognition circuitry or an accessory device, such as a headset or a remote controller, for example.

The camera 260 may be a still image camera or a video stream camera, capable for creating multimedia data for videophone service. The camera 260 comprises at least a sensor, a mirror and a lens.

The speaker 290 is configured to notify a user of an incoming call and to provide other user alarm sounds. Such speaker is advantageous especially in case the A/V output apparatus 110 (e.g. TV) is in off/standby mode. The speaker 290 also allows the user to answer the incoming call and hear the caller before turning the A/V output apparatus 110 (e.g. TV) on. Thus, the user may start the conversation while searching for a remote control of the A/V output apparatus 110 (e.g. TV), for example.

The microphone 270 is configured to capture user speech information for the video call service.

In an embodiment, the sensor 295 is configured to provide information on the position of a cover part in view of a body part. Furthermore, the sensor 295 indicates an operating mode of the apparatus. The sensor 295 may comprise at least one of the following: a switch, an optical sensor or a tilt sensor.

In an embodiment, the microphone 270 may be used to disable the speaker 290 when identical audio output is detected, using the microphone 270, from an external source, such as the A/V output apparatus 110. The device speaker 290 may only be required when the A/V output apparatus 110 (e.g. TV) is switched off or operating at very low volumes. The additional audio output from the A/V output apparatus 110 (e.g. TV) is at a variable distance from the microphone 270 (measured in time), compared to the on-board speaker 290 (internal source) which is at a fixed/known distance from the microphone 270. The identical audio output may be detected based on audio data comparison and based on distance calculation the audio data source may be determined to be the A/V output apparatus 110 (e.g. TV) and the speaker 290 may be switched off automatically. The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the videophone input apparatus 120, or into an adapter, card or the like that may be inserted into a suitable slot or port of the videophone input apparatus 120. The communication interface module 250 may support one radio interface technology or a plurality of technologies. The communication interface module 250 may support one wired interface technology or a plurality of technologies. The videophone input apparatus 120 may comprise a plurality of communication interface modules 250.

A skilled person appreciates that in addition to the elements shown in FIG. 2, the videophone input apparatus 120 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the videophone input apparatus 120 may comprise a disposable or rechargeable battery (not shown) for powering when external power if external power supply is not available.

In an embodiment the videophone input apparatus 120 is integrated to an A/V apparatus, such as a television.

In an embodiment, the videophone input apparatus 120 comprises speech or gesture recognition means. Using these means, a pre-defined phrase or a gesture may be recognized from the speech or the gesture and translated into control information for the apparatus 120, for example.

In an embodiment, the opening/closing (revealing/hiding) of a camera lens is used as an interaction technique (physical user interface) that accepts and ends the video call. Such solution provides many advantages. For a user, such solution represents a natural interaction being simple and analogical to picking up an old home phone, and by that means easily understandable. The revealing/hiding of the camera lens also protects (perceived) privacy. Typically, most people would not like to have a persistent "eye" in the living room. With this approach it is obvious for the user whether the camera is on or off. If you can see the lens, the apparatus is on, if you can't see the lens, the apparatus is off.

In an embodiment, audio privacy is also provided. A microphone may be disconnected (galvanic disconnect or physically obstruction) when the camera lens is hidden (closed). In effect this would ensure that privacy cannot be compromised by malicious software (i.e. the terminal is hacked with the intention of "listening in" via the microphone. Such solution provides the same privacy affordance of the hidden camera lens, but for audio too. A sensor may be used to sense the position of a cover part of the apparatus to provide information if the camera lens is hidden (cover part closed, microphone disconnected) or open (cover part open, microphone connected). Same sensor may be used for microphone and camera lens status, especially if both components are located in the cover part.

Figure 3:
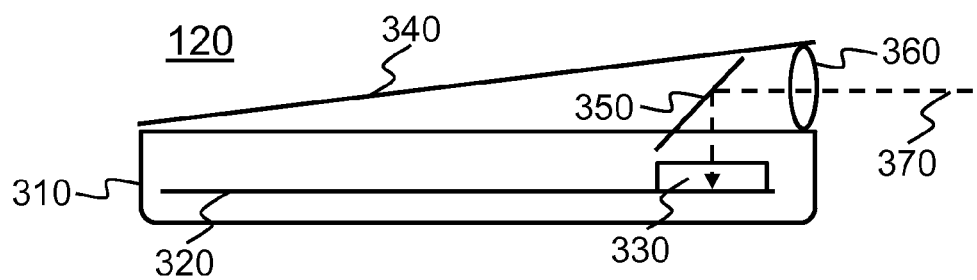
FIG. 3 presents a schematic picture of a videophone input apparatus in an operating position.

FIG. 3 presents a schematic picture of a videophone input apparatus 120 in an operating position in which various aspects of the disclosed embodiments may be applied.

In an embodiment, a videophone input apparatus 120 comprises a body part 310 configured to protect components of the apparatus 120. For example, a circuit board (PCB) 320 and an image sensor 330 may be protected by the body part 310. A cover part 340 is configured to be movable between an open position and a closed position. In FIG. 3, the open position is described.

A lens 360 may be located in the cover part 340, configured to receive incoming rays of light 370 in an operating position when the cover part 340 is in said open position. The image sensor 330 may be located on the circuit board (PCB) 320, configured to convert the directed rays of light 370 to an electronic image signal. The image sensor may be surface mounted on the circuit board 320. Surface mounting provides smaller size, lower costs and less technical vulnerabilities, for example.

A mirror 350 is configured to direct the rays of light 370 from the lens 360 to the image sensor 330. The mirror 350 may be connected to at least one of the cover part 340 and the body part 310.

In an embodiment, the cover part 340 may be connected to the body part 310 using a hinge, for example, enabling the cover part 340 to rotate out of the body part 310. Such movement may allow the mirror 350 to migrate to an angle of +/−45 degrees, for example. The mirror 350 may divert a scene based on the rays of light 370 (image) by 90 degrees onto a camera sensor 330 that is surface mounted onto a lateral printed circuit board (PCB).

In an embodiment, enabling the cover part 340 to move from the closed position to the open position triggers an activation of the apparatus 120. Such activation may comprise input to a videophone application, for example. The movement of the cover part 340 may be identified by a sensor and the sensor signal may be used for accepting an incoming call request, for example.

It is not essential how the components are located but the feature that by moving a cover part 340 compared to a body part 310, a lens 360 is hidden.

In an embodiment, the videophone input apparatus 120 may be integrated to an A/V apparatus, such as a television. In such case a body part 310 may be a part of the A/V apparatus, such as a television, and a cover part 340 may be configured to be movable between an open position and a closed position.

In an embodiment, a lens 360 and a sensor 330 may be both located in a cover part 340 or a body part 310.

In an embodiment a lens 360 and a sensor 330 may be located in different parts, one in a body part 310 and one in a cover part 340.

Figure 4:
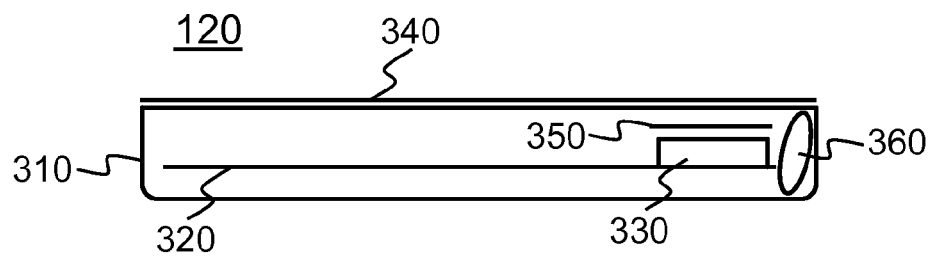
FIG. 4 presents a schematic picture of a videophone input apparatus in a standby position.

FIG. 4 presents a schematic picture of a videophone input apparatus 120 in a standby position, in which various aspects of the disclosed embodiments may be applied.

A lens 360 may be located in the cover part 340 and when in closed position the cover part 340 is received at least partially by the body part 310. Such position enables the lens 360 to be protected and hidden.

In an embodiment, the cover part 340 may be connected to the body part 310 using a hinge, for example, enabling the cover part 340 to rotate inside the body part 310. Such movement may allow the mirror 350 to migrate to an angle of essentially 0 degrees, for example. The mirror 350 may be rotated on top of the image sensor 330 parallel to the plane of the sensor 330. Such position protects the mirror 350 and the sensor 330. Furthermore, such position saves space needed for the apparatus 120.

In an embodiment, enabling the cover part 340 to move from the open position to the closed position triggers a deactivation of the apparatus 120. Such deactivation may comprise input to a videophone application, for example. The movement of the cover part 340 may be identified by a sensor and the sensor signal may be used for rejecting an incoming call request or ending an ongoing call, for example.

Movement of the cover part 340 in view of the body part 310 supports natural device interaction, hiding the camera eye when the camera is not required. Mechanism of FIGS. 3-4 also reduces costs and technical vulnerabilities by integrating the camera sensor 330 to a single circuit board (PCB) 320.

Figure 5:
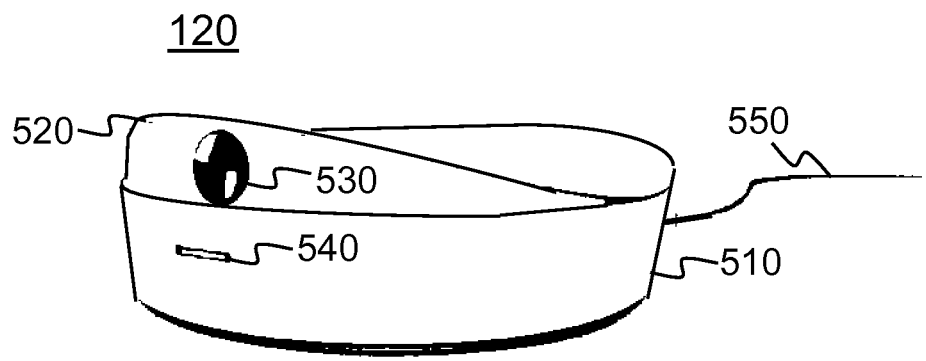
FIG. 5 presents an example embodiment of a videophone input apparatus in an operating position.

FIG. 5 presents an example embodiment of a videophone input apparatus 120 in an operating position. A cover part 520 is rotated at least partly outside a body part 510. Such movement reveals a lens 530 of a camera of the apparatus 120. In the operating position the lens 530 may receive rays of light for an image sensor inside the apparatus 120. A cable 550 may comprise at least one of a power cable, a SCART cable, a HDMI cable or a RCA cable. Furthermore, an aperture 540 may be located in a front wall of the body part 510. The aperture 540 may comprise for example a light source indicating the operating status of the apparatus 120, such as standby/incoming call/active call, using different colors of light. The aperture 540 may also comprise a movement detector to detect any movement in front of the apparatus 120. Such movement information may be used to activate functions in the apparatus 120, such as answering a call, rejecting a call, adjusting the ringing tone volume or muting a ringing tone for a call, for example.

In an embodiment the videophone input apparatus 120 may be integrated to an A/V apparatus, such as a television. A cover part 520 is rotated at least partly outside a body part 510. The body part may be the body part of the television. Such movement reveals a lens 530 of a camera of the apparatus 120. In the operating position the lens 530 may receive rays of light for an image sensor inside the apparatus 120. A cable 550 may not be needed but the necessary signals and power may be provided by internal signal lines of the A/V apparatus, such as the television. Furthermore, an aperture 540 may be located in a front wall of the body part 510 of the television (A/V apparatus). The aperture 540 may comprise for example a light source indicating the operating status of the apparatus 120, such as standby/incoming call/active call, using different colors of light. The aperture 540 may also comprise a movement detector to detect any movement in front of the apparatus 120. Such movement information may be used to activate functions in the apparatus 120, such as answering a call, rejecting a call, adjusting the ringing tone volume or muting a ringing tone for a call, for example.

In an embodiment, the apparatus 120 is configured to detect movement of a cover part 520. Such movement information may comprise information of the position of the cover part 520 in view of the body part 510. Movement detection may be done using a sensor, for example. Video call control functions may be defined based on the position of the cover part 520. Furthermore, information of transitions between different cover part positions may be used for defining video call control functions.

In an embodiment, video call control functions may comprise at least one of the following:
  answering an incoming call;
  rejecting an incoming call;
  muting an active call;
  ending an active call;
  switching off a videophone input apparatus; and
  turning on a videophone input apparatus.

In an embodiment, in case of an incoming call, and a cover part of a videophone input apparatus being in close position, a notification may be provided to a user of the apparatus. Such notification may comprise an alarm tone or notification on a display of an A/V apparatus, for example. The user may answer the incoming call by opening the cover part to open position, wherein the open position of the cover part is detected and in response to that the incoming call is answered. In case the cover part is not opened, the call is not answered.

In an embodiment, in case of an incoming call, and a cover part of a videophone input apparatus being in open position, a notification may be provided to a user of the apparatus. Such notification may comprise an alarm tone or notification on a display of an A/V apparatus, for example. The user may reject the incoming call by closing the cover part to closed position, wherein the closed position of the cover part is detected and in response to that the incoming call is rejected. In case the cover part is not closed, and a voice command or user interaction with the apparatus is detected, the call may be answered.

Figure 6:
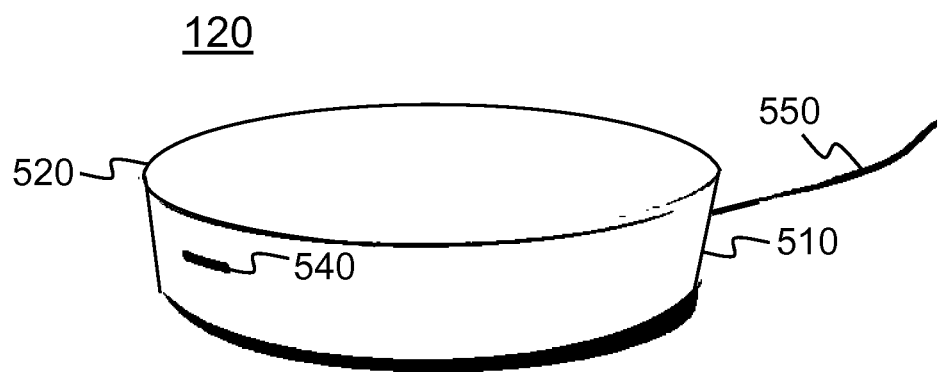
FIG. 6 presents an example embodiment of a videophone input apparatus in a standby position.

FIG. 6 presents an example embodiment of a videophone input apparatus 120 in a standby position. A cover part 520 is rotated at least partly inside a body part 510. Such movement hides a camera lens of the apparatus 120. A cable 550 may comprise at least one of a power cable, a SCART cable, a HDMI cable or a RCA cable. Furthermore, an aperture 540 may be located in a front wall of the body part 510. The aperture 540 may comprise similar functions as described for FIG. 5.

Figure 7:
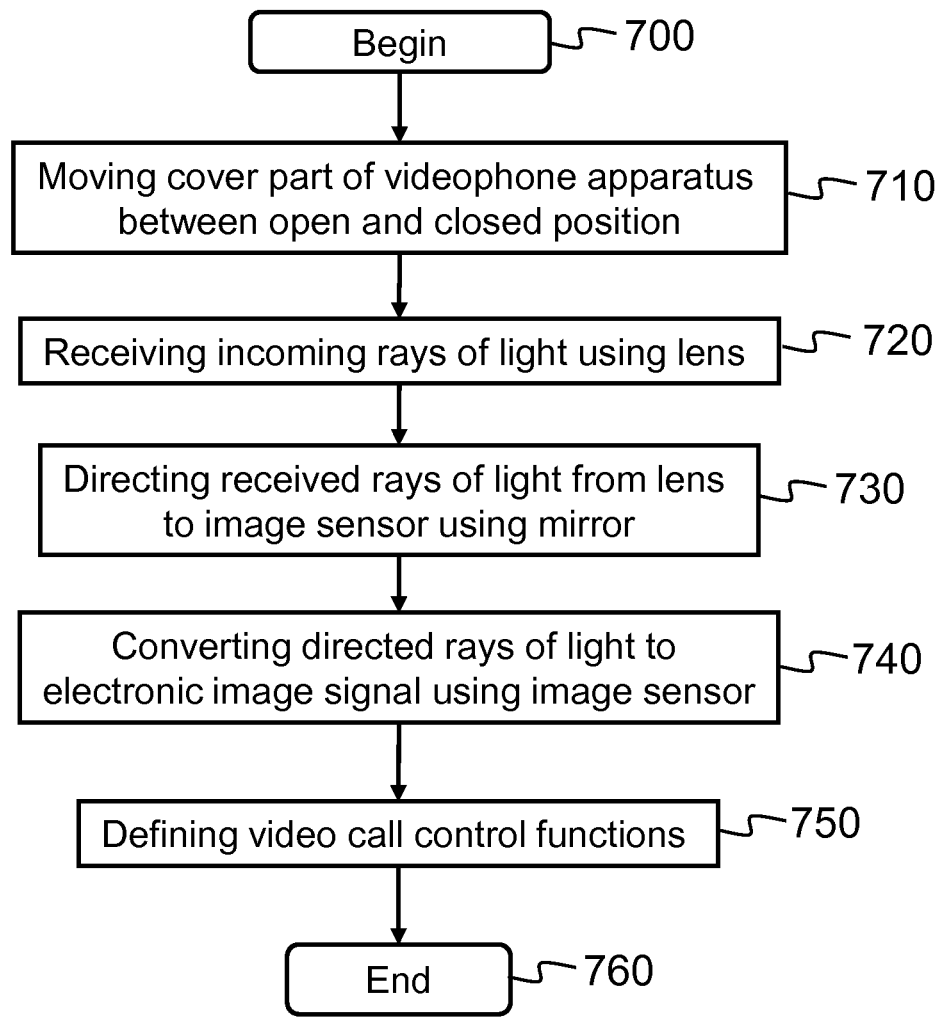
FIG. 7 shows a flow diagram showing operations in accordance with an aspect of the disclosed embodiments.

FIG. 7 shows a flow diagram showing operations in accordance with an example embodiment. In step 700, the method is started. In step 710, a cover part of a videophone apparatus is moved between an open and a closed position, the body part configured to protect a circuit board of the apparatus, the cover part comprising a lens, wherein when in said closed position, the cover part at least partially received by the body part and the lens configured to be hidden by the body part; and when in said open position, the lens configured to receive incoming rays of light. The incoming rays of light are received using the lens located in the cover part, when the cover part being in said open position, in step 720. In step 730, the received rays of light are directed from the lens to an image sensor using a mirror. In step 740, the directed rays of light are converted to an electronic image signal using the image sensor. In step 750, video call control functions are defined based on the open and closed positions of the cover part. The method is ended in step 760.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A videophone input apparatus comprising:
   body part configured to protect a circuit board of the apparatus;
   a cover part configured to be movable between an open position and a closed position;
   a lens located in the cover part, configured to receive incoming rays of light in an operating position when the cover part being in said open position, and the lens configured to be hidden, by the body part, in a standby position when the cover part being in said closed position;
   an image sensor configured to convert the rays of light directed from the lens to an electronic image signal;
   at least one processor; and
   at least one memory including computer program code;
   the at least one memory and the computer program code configured to, with the at least one processor, cause the videophone input apparatus to:
      define video call control functions based on the open and closed positions of the cover part.

2. The videophone input apparatus of claim 1, wherein the at least one memory and the computer program code further configured to, with the at least one processor, cause the videophone input apparatus to:
   determine an answering function in response to detecting the cover part in open position; and
   determine a rejecting function in response to detecting the cover part in closed position.

3. The videophone input apparatus of claim 1, wherein the cover part, when in said closed position, configured to be at least partially received by the body part.

4. The videophone input apparatus of claim 1, wherein the imaging sensor being located on the circuit board; and
   the videophone input apparatus further comprising a mirror configured to direct the rays of light from the lens to the image sensor.

5. The videophone input apparatus of claim 4, wherein the mirror is configured to be movable.

6. The videophone input apparatus of claim 4, wherein the mirror is configured to be moved in response to the moving of the cover part.

7. The videophone input apparatus of claim 1, wherein the image sensor being surface mounted on the circuit board.

8. The videophone input apparatus of claim 1, further comprising a sensor configured to provide position information of the cover part.

9. The videophone input apparatus of claim 6, wherein the mirror being in an operating position above the image sensor, and a surface plane of the mirror configured to be nonparallel to a surface plane of the image sensor, when the cover part is in open position.

10. The videophone input apparatus of claim 6, wherein the mirror being in a storage position above the image sensor, a surface plane of the mirror is configured to be essentially parallel to a surface plane of the image sensor, when the cover part is in closed position.

11. The videophone input apparatus of claim 6, wherein the mirror is configured to be rotatable 45 degrees in response to the cover part moving from the closed position to the open position.

12. The videophone input apparatus of claim 1, further comprising:
   a microphone configured to receive an incoming audio signal in an operating position when the cover part being in said open position, and the microphone configured to be muted, by the body part, in a standby position when the cover part being in said closed position.

13. The videophone input apparatus of claim 12, wherein the microphone is configured to be disconnected in response to detecting the cover part in closed position.

14. The videophone input apparatus of claim 12, wherein the at least one memory and the computer program code further configured to, with the at least one processor, cause the videophone input apparatus to:
   determine an unmute function in response to detecting the cover part in open position; and
   determine a mute function in response to detecting the cover part in closed position.

15. A method comprising:
   moving a cover part of a videophone input apparatus between an open and a closed position, a body part configured to protect a circuit board of the apparatus, the cover part comprising a lens, wherein when in said closed position, the lens configured to be hidden by the body part; and when in said open position, the lens configured to receive incoming rays of light;
   receiving the incoming rays of light using the lens located in the cover part, when the cover part being in said open position;
   directing the received rays of light from the lens to an image sensor;
   converting the directed rays of light to an electronic image signal using the image sensor; and
   defining video call control functions based on the open and closed positions of the cover part.

16. An A/V output apparatus, comprising an integrated videophone input apparatus comprising:
   a body part configured to protect a circuit board of the A/V output apparatus;
   a cover part configured to be movable between an open position and a closed position;
   a lens located in the cover part, configured to receive incoming rays of light in an operating position when the cover part being in said open position, and the lens configured to be hidden, by the body part, in a standby position when the cover part being in said closed position;
   an image sensor configured to convert the rays of light directed from the lens to an electronic image signal;
   at least one processor; and
   at least one memory including computer program code;
   the at least one memory and the computer program code configured to, with the at least one processor, cause the A/V output apparatus to:
   define video call control functions based on the open and closed positions of the cover part.

17. A computer program embodied on a computer readable non-transitory medium comprising computer executable program code, which when executed by at least one processor of a videophone input apparatus, causes the videophone input apparatus to:
   detect position information of a cover part of the videophone input apparatus, the cover part configured to be movable between an open position and a closed position, a body part configured to protect a circuit board of the apparatus, the cover part comprising a lens, wherein when in said closed position, the lens configured to be hidden by the body part; and when in said open position, the lens configured to receive incoming rays of light;
   receive the incoming rays of light using the lens located in the cover part, when the cover part is in said open position;

direct the received rays of light from the lens to an image sensor;
convert the directed rays of light to an electronic image signal using the image sensor; and
define video call control functions based on the open and closed positions of the cover part.

* * * * *